(12) United States Patent
Cousineau

(10) Patent No.: US 12,085,911 B2
(45) Date of Patent: Sep. 10, 2024

(54) METHOD, COMPUTER PROGRAM AND APPARATUS FOR ANALYSING A PROGRAMMABLE LOGIC CONTROLLER PROGRAM

(71) Applicant: MITSUBISHI ELECTRIC CORPORATION, Tokyo (JP)

(72) Inventor: Denis Cousineau, Rennes (FR)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 483 days.

(21) Appl. No.: 17/429,782

(22) PCT Filed: Feb. 7, 2020

(86) PCT No.: PCT/JP2020/005931
§ 371 (c)(1),
(2) Date: Aug. 10, 2021

(87) PCT Pub. No.: WO2020/195313
PCT Pub. Date: Oct. 1, 2020

(65) Prior Publication Data
US 2022/0137586 A1 May 5, 2022

(30) Foreign Application Priority Data
Mar. 28, 2019 (EP) .................................. 19305408

(51) Int. Cl.
*G05B 19/05* (2006.01)
(52) U.S. Cl.
CPC .. *G05B 19/056* (2013.01); *G05B 2219/13004* (2013.01); *G05B 2219/13052* (2013.01); *G05B 2219/13142* (2013.01)
(58) Field of Classification Search
USPC ........................................................ 700/86
See application file for complete search history.

(56) References Cited

U.S. PATENT DOCUMENTS

| 2005/0166167 A1* | 7/2005 | Ivancic | G06F 11/3608 703/22 |
| 2006/0282807 A1* | 12/2006 | Ivancic | G06F 11/3608 716/106 |
| 2018/0246706 A1* | 8/2018 | Fan | G06F 8/433 |

OTHER PUBLICATIONS

Adiego, "Applying Model Checking to Industrial-Sized PLC Programs" IEEE Transactions on Industrial Informatics, vol. 11, No. 6, Dec. 2015, pp. 1400-1410, (Year: 2015).*

(Continued)

*Primary Examiner* — Emilio J Saavedra
(74) *Attorney, Agent, or Firm* — Birch, Stewart, Kolasch & Birch, LLP

(57) ABSTRACT

It is disclosed a PLC Program analysis method where a program (PROG) is translated (TRANS) into a model (MOD) in a logical framework, from which properties (Prop) are determined. Said properties coupled with user specifications (IntProp) are verified by an automated solver (SMT). If contraposition of a property (Prop) is satisfiable, counter-examples (PROOF NOK) representative of model inputs and internal memory values is provided. Counter-examples (PROOF NOK) are translated into error initial configurations (IniConf) of said model. Execution of the model is simulated (EXE) with said model error initial configurations (IniConf), and error intermediary configurations (AST-IntConf) of said model simulation are recorded up to said property violation. Error initial and intermediary configurations (Lad-IniConf, Lad-IntConf) of said original program (PROG) are derived from error initial configurations (IniConf) of said model and error intermediary configurations (AST-IntConf) of said model simulation and displayed. An apparatus for executing said method is provided.

15 Claims, 7 Drawing Sheets

(56) References Cited

OTHER PUBLICATIONS

Biallas "Formal Methods for Industrial Critical Systems: Predicate Abstraction for Programmable Logic Controllers" 18th International Workshop, FMICS 2013 Madrid, Spain, Sep. 2013 Proceedings, p. 124-138 (Year: 2013).*
Moon, "Modeling Programmable Logic Controllers for Logic Verification" IEEE Control Systems Magazine 14(2), 53-59 (1994) (Year : 1994).*
Peleska, "Industrial-Strength Model-Based Testing—State of the Art and Current Challenges" Eighth Workshop on Model-Based Testing (MBT 2013) EPTCS 111, 2013, pp. 3-28 (Year: 2013).*
Nuxmv, "The nuXmv model checker" accessed at: https://web.archive.org/web/20181126133826/https://es-static.fbk.eu/tools/nuxmv / Nov. 26, 2018, 1 page PDF print out (Year: 2018).*
International Search Report, issued in PCT/JP2020/005931, PCT/ISA/210, dated Jun. 4, 2020.
Written Opinion of the International Searching Authority, issued in PCT/JP2020/005931, PCT/ISA/237, dated Jun. 4, 2020.
Chinese Office Action and Search Report for Chinese Application No. 202080023211.0, dated Feb. 8, 2024, with English translation.

* cited by examiner

```
module ProgPou use export ladder_overflow. Ladder type inputs = {
    x0 "model" "model_trace: X0" : pulse
} type in_outputs = {
    d1 "model" "model_trace: D1" : int
} type outputs = int type result_t = {
    f_outs "model" "model_trace: F_outs" : outputs;
    f_in_outs "model" "model_trace: F_in_outs" : in_outputs
} let progPou_scan (last_outs "model" "model_trace:new" : outputs)
                 (last_in_outs "model" "model_trace:last" : in_outputs)
                 (ins "model" "model_trace: last" : inputs)
    requires { "model_vc" ((0 <= last_in_outs.d1) /\ (last_in_outs.d1 <= 65535)
              )
    }
=
    let common_1 = ins.x0 in
    let d1_1 = "expl: 16" inc_16u (False) (common_1) (last_in_outs.d1) in
    let common_2 = ins.x0 in
    let d1_2 = "expl: 16" inc_16u (False) (common_2) (d1_1) in
    let common_3 = ins.x0 in
    let d1_3 = "expl: 16" inc_16u (False) (common_3) (d1_2) in
    { f_outs = 0; f_in_outs = { d1 = d1_3 } }
end
```

FIG. 3b $$\| X \| \rightarrow 0 <= \| D1 \| <= 9999$$

FIG. 4

METHOD, COMPUTER PROGRAM AND APPARATUS FOR ANALYSING A PROGRAMMABLE LOGIC CONTROLLER PROGRAM

TECHNICAL FIELD

The present invention relates to methods and apparatuses for analysing a program written in a language described in the IEC 61113-3 standard. Such a program is intended in particular for a Programmable Logic Controller (PLC) to carry out the control of industrial systems.

The present invention relates more particularly to a method and apparatus for analysing, detecting and correcting errors in a Ladder program.

BACKGROUND ART

Programmable logic controllers (PLC) are industrial digital computers used as automation controllers of manufacturing processes, such as assembly lines or robotic devices.

PLCs are provided with software that computes outputs from the values of inputs and internal memory, and have therefore replaced hard-wired relays, timers and sequencers. Ladder language, also known as Ladder Logic, is a programming language used to develop PLCs software. This language uses circuits' diagrams of relay logic hardware to represent a PLC program by a graphical diagram. The standard IEC 61131-3 describes the Ladder language among several other languages for programming a PLC.

A part of a software development process is dedicated to debugging. Debugging consists in checking that a program behaves safely and according to given specifications. Debugging needs to be performed before implementation in production environment, since bugs in factories can be extremely expensive in terms of human and material damages, and plant closing time.

The usual method is the simulation method, which consists in setting some tests defined by initial configurations and executing the program on said tests to check its behaviour under these configurations. The program is usually executed in a software simulation of the factory.

The main drawback of such a method is that it is not exhaustive and is time-consuming and therefore costly. This non-exhaustivity makes it quite impossible to guarantee that the selected tests cover all possible executions of a program once in production environment. Bugs can remain in the program after the testing phase, since the only guarantee is that the program doesn't bug for the tested configurations.

Model-checking method consists in consecutively executing a model of the program to test, instead of the program itself in order to save time and resources. However, execution paths-related complexity is often exponential especially for industrial applications. Testing efficiency is limited by CPU time and, therefore, this method is still not exhaustive.

Moreover, tests are partially or fully developed and run manually, since at least some configurations need to be manually defined to generate and execute said tests. Although part of tests generation and execution can be automated, another drawback of such a method is that output values of the test still must be analysed by programmers, the only available information about the bug being the initial configurations of inputs and internal memory that lead to the bug. It is therefore often hard to understand the fundamental reason of the error and why the considered initial configuration leads to that error at some point of the program.

SUMMARY OF INVENTION

According to one aspect of the present invention, it is disclosed a Programmable Logic Controller Program analysis method comprising the following steps:
  translating an original program of the type of a Programmable Logic Controller Program, into a model in a logical framework;
  determining, from at least said model and predefined language formalization, a set of properties on internal variables of said original program;
  verifying, by an automated solver, satisfiability of said set of properties coupled with user specifications and providing, if contraposition of a property from said set of properties is satisfiable, a set of counter-examples representative of model inputs and internal memory values for which said property contraposition is satisfiable, or providing, if said set of properties is always satisfied, confirmation thereof;
  translating counter-examples, into error initial configurations of said model, said initial configurations comprising initial values of inputs and internal memory;
  simulating the execution of the model with error initial configurations of said model, and recording error intermediary configurations of said model simulation, from the beginning of execution up to said property violation, said intermediary configurations comprising intermediary values of internal memory;
  translating error initial configurations of said model and error intermediary configurations of said model simulation, into error initial and intermediary configurations of said original program; and displaying said program error initial and intermediary configurations.

Under these dispositions, a bug occurs when one or several properties relative to the program is/are violated. A property relates to the values of inputs, outputs and local memory of the program. The present invention allows detection of such violations before execution of the program in a simulated or real environment. The method consists in finding initial values of inputs and local memory which lead to an error during execution of the program. The debugging is automated and accelerated. The method is exhaustive as it guarantees that no execution configuration would violate the program properties if no error scenario is found with the described method. Indeed, in the prior art, even if no property violation is detected during the execution of tests, there is no guarantee that the property will hold for all possible executions.

Useful information about the error scenario is also provided along with the program code, to indicate where, how and why such an error occurs during execution of the program, thanks to the obtained initial and intermediary configurations. The property violation is precisely explained. The initial configuration that leads to the property violation is computed and execution information such as memory assignments is recorded and retrieved, from the initial configuration to the point of the program where the property is violated. The method detects either instructions errors or functional specifications violations expressed by the programmer in first-order logic, as interlocking properties. The program can be printed with additional information relative to memory values during the execution, such as initial and intermediary values that lead to property violation and how to fix the bug. Therefore, the method allows automatic debugging as no human intervention is needed to determine tests to run, supervise their execution and analyse their results.

The method also allows faster debugging as it relies on property verification instead of consecutively executing the program under multiple test configurations to simulate, as it is the case of automated simulation which has limitations for complex programs of industrial size. Execution time on a central processing unit is therefore reduced.

Thanks to these dispositions, there is provided an efficient, exhaustive and fast tool for safely reducing Ladder programs time-to-deploy in the factory automation industry.

The model is preferably expressed in the first-order logical framework, which can be mathematically provable, and is therefore useful in representing computational problems. Moreover, first-order logic is adapted to express properties derived from Ladder models and corresponding functional specifications, and generation of first-order logic properties is easier to automate compared to superior logical frameworks.

According to an embodiment, the step of translating the original program into the model comprises a first intermediary step of expression of said original program as an Abstract Syntax Tree, and a second intermediary step of generation of the model from said Abstract Syntax Tree.

Implementation of such intermediary steps is advantageous as an Abstract Syntax Tree can be enhanced with information such as properties and annotations for every element it contains. Said Abstract Syntax Tree is preferably described in a functional language such as OCAML. An Abstract Syntax Tree also allows storing the position of each element in the Ladder program, which is useful in retrieving error intermediary configurations during the simulated execution of the model.

To that end, the step of simulating model execution preferably comprises:
  a first intermediary step of translating said model error initial configurations into error initial configurations corresponding to the Abstract Syntax Tree;
  a second intermediary step of computing the Abstract Syntax Tree with said corresponding initial configurations and retrieving intermediary values of internal memory corresponding to the Abstract Syntax Tree.

The Abstract Syntax Tree representation is advantageous as it allows generating intermediary values which cannot be obtained by a simple execution of the Ladder program, such as values at logical gates connecting instructions.

According to an embodiment, the step of translating the original program into the model comprises an intermediary step of static single assignment transformation. The static single assignment transformation is preferably applied on the Abstract Syntax Tree representation and is advantageous to keep track of internal memory values during execution.

According to an embodiment, during the step of determining the set of properties, said set of properties is computed using Dijkstra's weakest precondition calculus to determine preconditions on said set of properties, verification of said set of properties being performed on the basis of preconditions thereof. Preconditions are underlying hypotheses that are inherent to a property. A satisfied precondition implies that the property is verified and that no error occurs during execution thereof.

According to an embodiment, satisfiability of said set of predicates coupled with user specifications is verified using a Satisfiability Modulo Solver, which is an automated solver configured to solve satisfiability modulo theories problems, which are decision problems expressed in first-order logic as logical formulas.

According to another aspect of the present invention, it is disclosed a computer program comprising instructions for performing the method as described hereinbefore, when these instructions are run by at least one processor.

In a preferred embodiment, said computer program is executed on a deductive program verification platform.

The invention further aims at a non-transitory computer readable medium storing a computer program according to the invention, and causing a computer to execute the steps of the method as defined above.

According to another aspect of the present invention, it is disclosed an apparatus for executing a Programmable Logic Controller Program analysis method as described hereinbefore. Such an apparatus can include, in an embodiment, a processing circuit PC (as shown in the example of FIG. 6) comprising:
  A memory MEM storing the aforesaid computer program instructions, and possibly also other data such as transitory calculation data,
  A processor PROC for reading the content of memory MEM and performing the steps of the method according to the invention, and
  Possibly an input/output interface INT to receive/send data (through a network or any other link) to be processed/processed by the processor PROC.

BRIEF DESCRIPTION OF DRAWINGS

Other features and advantages of the invention appear from the following detailed description of one of its embodiments, given by way of non-limiting example, and with reference to the accompanying drawings, in which:

FIGS. 3a and 3b illustrate execution results of intermediary steps involved in the disclosed method, FIG. 4 illustrates another execution result of an intermediary step involved in the disclosed method.

DESCRIPTION OF EMBODIMENT

In the figures, the same references denote identical or similar elements.

Figure 1:
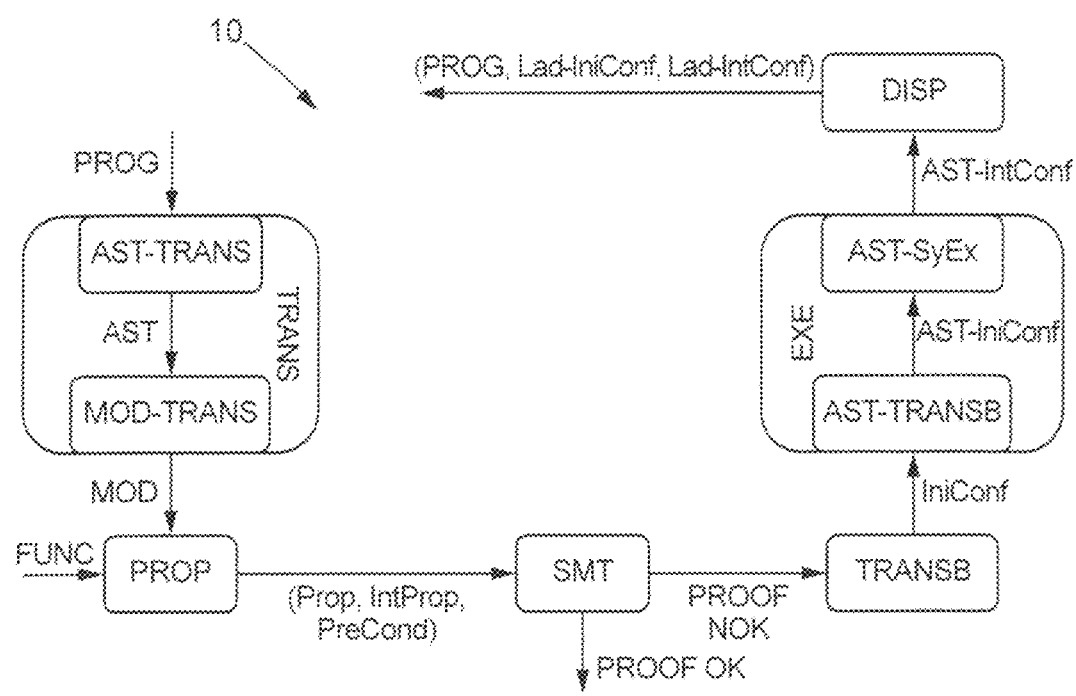
FIG. 1 illustrates an exemplary set of steps involved in the disclosed method.

FIG. 1 shows an exemplary set of steps designated by reference numeral 10 and involved in a Ladder program deductive verification.

The first step (TRANS) of the method is a translation step, consisting in translating a PLC program (PROG) into a model (MOD).

Said PLC program PROG is executable on a programmable logic controller hereinafter referred to as PLC. A PLC is capable of storing and executing instructions, such as sequencing, timing, counting, arithmetic, data manipulation, and communication, in order to control industrial machines and processes. Interfacing circuitry to field devices is provided in the form of input and output connections.

Figure 2:
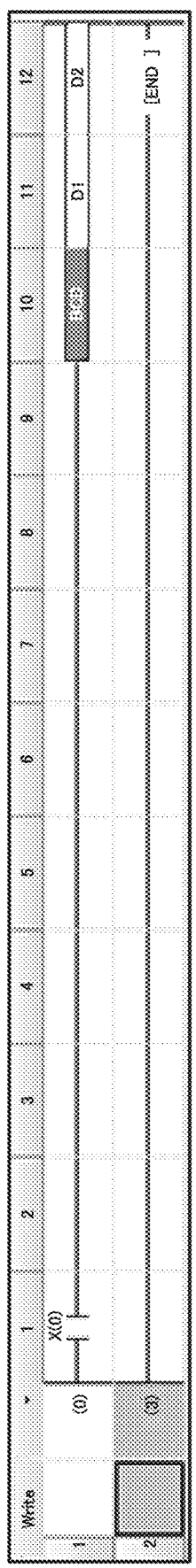
FIG. 2 represents an example of a Ladder diagram.

A Ladder diagram represents the sequential control logic of the PLC program in a graphical diagram. The Ladder language is a graphical language which mimics a relay logic electrical schematic as shown in FIG. 2 which represents an example of a Ladder diagram. The Ladder logic is actually a rule-based language. Rules, also called "rungs", are instantiated when activated by conditions in a set of data. A set is selected according to said activation and the statements belonging to those rules execute. When implemented with electromechanical devices such as relays, the various rules which make up the program are executed sequentially in a continuous loop as part of a software. An effect of simultaneous and immediate execution can be achieved by executing the loop many times per second. Rungs are executed in a given order to achieve proper operation of programmable controllers. More particularly, a Ladder program can comprise one loop executed successively, for example every 100 milliseconds.

Rung inputs are logical checkers, also referred to as "contacts". So-called "contacts" may refer to physical or hard inputs to the programmable controller from physical devices such as pushbuttons and limit switches via an integrated or external input module. Contacts may also represent the status of internal storage bits which may be generated elsewhere in the program.

Rung outputs are actuators represented by "coils". The "coil" may represent a physical output which operates some device connected to the programmable controller, or may represent an internal storage bit for use elsewhere in the program. Each contact or coil corresponds to the status of a single bit in the programmable controller's memory. These instructions provide the ability to examine the ON/OFF status of specific bit addresses in memory and control the state of internal and external outputs. Unlike electromechanical relays, a ladder program can refer any number of times to the status of a single bit, equivalent to a relay with an indefinitely large number of contacts.

In the Ladder diagrams, rungs are constructed as a network of connected instructions. Connections between instructions represent the logic relationship between said instructions. For example, in Ladder logic the OR logic is implemented with a parallel connection of two contacts, whereas AND logic is implemented with ladder logic as a serial connection of contacts.

The translation operated in the first step (TRANS) is performed by implementing a translation algorithm. The translation algorithm uses predefined modelizations of Ladder primitives, to translate the Ladder program (PROG) into a model (MOD) expressed in a logical framework. Ladder primitives consist of logic instruction elements which constitute Ladder logical circuits, such as logical checkers represented by contacts, actuators represented by coils, function blocks and more generally any basic or enhanced ladder language instructions.

The model (MOD) is preferably expressed in the logical framework of first-order logic. First order logic is an extension of propositional logic and considers whether propositions are true or false in a partial view of the world, called a domain. First order logic consists of an alphabet, a first order language, a set of axioms and a set of inference rules. As first order logic can be mathematically provable, it is useful in representing computational problems. First order logic is made up of syntax and semantics. The syntax of first order logic is a formal language used to express concepts, the semantics of first order logic formulae determining the value of any first order logic formula.

Given the sequential structure of Ladder programs, the translation is operated only on the instructions comprised in the loop itself. Therefore, expression of the program model in temporal logic is not required, as the program doesn't involve successive execution of loops. During the first step of translation, algebraic datatypes are used to modelize inputs, internal memory and outputs of the program, whereas polymorphic types are used to factorize the number of model primitives.

Modelling of instructions consists in expressing them as first-order formulas, to represent predicates. A predicate is basically a binary-valued function of non-binary variables. Authorized values of inputs and local memory at execution time can be obtained from such predicates. Instructions modelizations may be associated to properties, represented as first-order formulas, that express the authorized values of inputs and local memory at execution time, i.e. the values for which the instruction does not raise an error when it is executed. These formulas may be linked to additional information, like the instruction and the error reason they refer to.

The Ladder model is generated using a mathematical statement comprising said predicates. In other words, the goal of the Ladder program is expressed with a set of predicates in a chosen mathematical logic. The verification of such mathematical statement ensures that the computational approach of a program is correct. Verification of such mathematical statement makes explicit the reasons why the computational approach performs what it is expected to calculate. Such verification is also called a proof, and ensures the safety of execution and the soundness of the program associated with the mathematical statement. Safety of execution is ensured if it is proven that, during the program execution, no runtime errors—such as an illegal access to memory or overflow, an illegal operation like an attempt to divide by 0 or, in the case of other types of programs involving successive executions of loops, termination issues like an infinite loop—are encountered. The program soundness is also referred to as functional correctness and consists in verifying that the program does what it is supposed to do.

In formal logic, a logical system has the soundness property if and only if every formula that can be proved in the system is logically valid with respect to the semantics of the system. In other words, a system is sound when all of its theorems are tautologies. Soundness of a deductive system is the property that any sentence that is provable in that deductive system is also true on all interpretations or structures of the semantic theory for the language upon which that theory is based.

In a preferred embodiment, the first step comprises a first intermediary step (AST-TRANS) where the ladder program is firstly represented as an Abstract Syntax Tree, also known as an AST representation or syntax tree and hereinafter referred to by the acronym AST. The Ladder model is then generated from the AST representation of the Ladder program in a second intermediary step (MOD-TRANS).

An abstract syntax tree is a tree representation of the abstract syntactic structure of source code written in a programming language. Each node of the tree denotes a construct occurring in the source code, which is, in the present embodiment, the Ladder program.

An AST can be edited and enhanced with information such as properties and annotations for every element it contains. Such editing and annotation is impossible with the source code of the Ladder program, since it would imply changing it.

Compared to the Ladder program, its AST does not include every detail appearing in the real syntax, but rather just the structural and content-related details such as braces, semicolons or parentheses. A syntactic construct like an if-condition-then expression may be denoted by means of a single node with three branches.

An AST usually contains extra information about the program, due to the consecutive stages of analysis by a compiler. Representation of the Ladder program in AST is advantageous as it allows storing the position of each element in the Ladder program, which is useful in the following steps of the method. This intermediary step is also interesting as a complete traversal of the AST generally allows verification of the correctness of the program.

In the present embodiment, said AST representation is preferably described in a functional language such as OCAML.

Figure 3A:
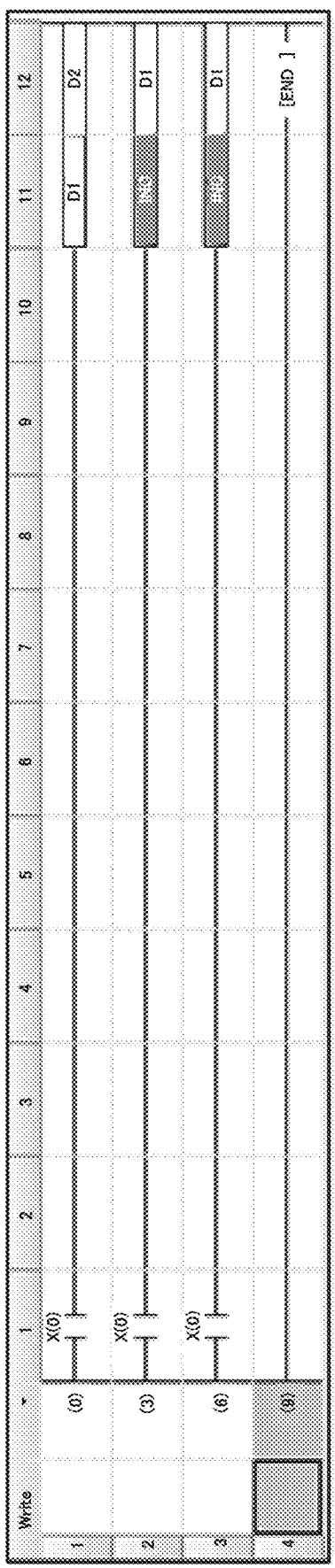

In a preferred embodiment, the translation algorithm comprises a third intermediary step where static single assignment transformation (SSAT) is used to keep track of internal memory values during the execution of the program. In imperative programming languages such as the Ladder language, assignments allow variables to hold different values at different times during their life-span and scope. Static single assignment transformation is advantageous to keep track of values assigned at each stage of execution. In order to perform deductive verification on a program written in an imperative language, transformation into a functional model is required and is performed on the model, more particularly on the AST representation, thanks to the static single assignment transformation. Static single assignment transformation can be seen as a linking step that allows adding information to model elements, like code locations, in order to link them to Ladder program elements. Therefore, tracing back to the original Ladder program (PROG) can be easily performed. FIG. 3b provides an example of such a static single assignment transformation, where the values of the integer D1 at different steps of the model execution are stored as the values of (d1_1, d1_2, d1_3). The equivalent of this transformation is represented in the Ladder diagram of FIG. 3a.

The second step (PredT) of the method consists in generating properties (Prop) from the Ladder program model (MOD). The second step combines the model (MOD) with predefined language formalization (LForm), to obtain properties (Prop) related to said model (MOD). Conditions (Cond) on said properties are then obtained.

Such properties are representative of the operations performed at the model execution, and are expected to be verified at each stage of the execution. They are similar to verifying a loop invariant at each recursive call. Conditions on said properties can be classified into two categories: preconditions and post-conditions.

The preconditions (PreCond) indicate underlying hypotheses that are inherent to a property (Prop) and that should be verified before its execution; otherwise an error may occur. More particularly, when a routine is called, preconditions corresponding to said routine properties are supposed to be satisfied so that said routine properties are verified.

For example, a factorial function program comprises a loop which is representative of a recursive calculus performed on a variable. A precondition of such loop is that the variable of which the factorial is calculated must be a positive integer at the beginning of the loop.

Post-conditions are representative of the result expected when a routine is called with the preconditions being verified. Preconditions of a routine property can therefore be deduced from the result expected at the end of the routine upon property computation. In the case of loops, preconditions and post-conditions are closely related or even similar and form the loop invariant, in particular in programs involving successive executions of loops. If a post-condition is satisfied at a stage of execution of the loop, then it is ensured that the precondition of the next stage is satisfied as well.

Figure 4:
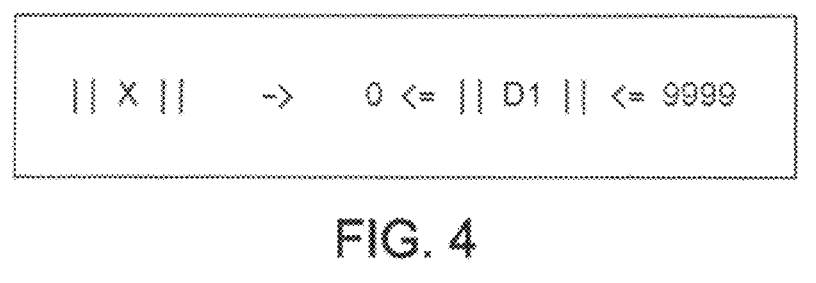

To that end, this second step (PredT) uses Dijkstra's weakest precondition calculus to compute said properties and determine the preconditions (PreCond) related to the model properties (Prop). FIG. 4 illustrates an example of a property generated and computed in the second step to obtain preconditions. The property of FIG. 4 can be read as follows: "If the value stored in X is "ON"/"True" then the value stored in D1 is greater than 0 and less than 9999".

Execution of Dijkstra's weakest precondition calculus on first-order logic properties ensures that such a computation is sound, while minimizing the size of computed properties. Preconditions provide the definition domain of each property. This step ensures the soundness of the proof, as a satisfied precondition implies that the routine property holds and that no error occurs during execution thereof. Consequently, if properties are satisfied, or, in other words, the contraposition of said properties is not satisfiable, then no error can happen when executing the corresponding Ladder program.

In an advantageous embodiment, other properties are expressed from user specifications (FUNC). User specifications are also referred to as functional specifications and describe the expected behavior of the program, i.e. the functions that a program must perform to meet what is needed by a program user, as well as requested properties of inputs and outputs. For example, in an industrial context, a robot arm can be requested to operate only when a sensor is receiving a signal within a given range. The program as written is supposed to conform to said specifications; however, computing properties derived from user specifications is an additional safety measure since the written program can contain instruction errors.

These properties are interlocking properties (IntProp) and are obtained by expressing functional specifications in first-order logic. Said interlocking properties are computed with the model's properties as additional post-conditions to satisfy. Preconditions (PreCond) can therefore be derived from these interlocking properties as well, with the use of Dijkstra's weakest precondition calculus.

Superior logical frameworks can be used also in the first and second steps; however, first-order logic is generally adequate to express properties derived from Ladder models (Prop) and corresponding functional specifications (IntProp). Superior logical frameworks may introduce unnecessary complexity regarding the final application. Moreover, generation of first-order logic properties is easier to automate compared to superior logical frameworks.

Computation of properties derived from functional specifications ensures that when the model's properties are satisfied, no error deriving from a violation of functional specifications occurs at execution time.

The second step is also known as predicate transformation and is preferably computed on a deductive program verification platform (PLAT), which comprises appropriate tools to receive the ladder model as an input and generate formal proofs of various programs. The first step is also preferably computed on a deductive program verification platform (PLAT). Instructions modelization may be performed through an external modelization tool, which can consist in a library downloaded in said deductive program verification platform and comprising predefined templates and models of the Ladder language. In an advantageous embodiment, said platform (PLAT) is of the type of WHY3, and the Ladder model (MOD) is expressed in a programming language of the type of WHYML.

The third step (SMT) of the method uses an automated solver in order to either formally prove the properties generated in the second step, or to find counter-examples to these properties. Said generated properties are formally proven if they are always satisfied, or if the contraposition thereof is not satisfiable. Satisfiability of said properties (Prop) or contraposition thereof is evaluated in accordance with their previously defined preconditions (PreCond).

In a preferred embodiment, the third step is performed by an automatic theorem prover for satisfiability modulo theories (SMT) problems, which can be used to prove the validity—or, dually, the satisfiability—of first-order formulas in a large number of built-in logical theories and their combination. Such a solver is configured to solve satisfiability modulo theories problems, which are decision problems expressed in first-order logic as logical formulas. An SMT-problem is a SAT problem in which propositional variables are replaced with formulas of another mathematical theory. More specifically, an SMT problem is expressed as a set of SMT instances which are formulas in first-order logic with additional interpretations.

The deductive program verification platform previously used in the second step generally includes automatic solvers as well. Therefore, it may be used to compute the third step as well. An example of a solver that may be used preferably is CVC4. Another example can be Z3 and Alt-Ergo. The solver must be configured to interact properly with the platform to run the proof and provide counterexamples. Said interaction includes indications of model elements on which proof or counterexamples are required. In the preferred embodiment where said platform (PLAT) is WHY3, model elements on which proof or counterexamples are required can be labelled by specific functions in the WHYML language, as can be seen of FIG. 3b with the label "model-trace".

Resolution is performed heuristically with respect to background theories and consists in determining if the SMT instance is satisfiable. The properties obtained from the second step are resolved at least with respect to the theory of integer linear arithmetic, and preferably the theory of records, linear real arithmetic and strings. In an advantageous embodiment, the automatic theorem prover is based on first-order logic with polymorphic types and preferably includes built-in base theories such as rational and integer linear arithmetic, arrays, tuples, records, inductive data types, bit-vectors, strings, and equality over uninterpreted function symbols. In a more preferred embodiment, such automatic theorem prover further includes support for quantifiers and model generation abilities.

If properties (Prop, IntProp) obtained at the second step are satisfied upon computation thereof with the use of an SMT solver, a response (PROOF OK), representative of the proof that the properties are satisfied, is generated by the SMT-solver. It is then ensured that no instructions of the program (PROG) can error at production time, and/or that the functional specifications (FUNC) expressed by the user, hold for all possible executions of the Ladder program (PROG). The soundness of the program (PROG) is therefore demonstrated.

Otherwise, if the contraposition of a property (Prop, IntProp) is satisfiable, a counterexample to the property is provided by the solver. A response (PROOF NOK) representative of said counterexample is generated by the SMT-solver, and corresponds to a model configuration that leads to the case where said property is not satisfied. In particular, the content of the counterexample refers at least to initial configurations as the formal proof is evaluated on the basis of preconditions (PreCond).

The fourth step of the method translates (TRANSB) the obtained properties counterexamples (PROOF NOK) into model configurations, and more particularly into initial model configurations. Said model configuration comprises model inputs and internal memory values. This translation is performed on the basis of said predefined language formalization (LForm), and operates as a reverse of the properties generation process in the second step from the model (MOD).

The obtained properties counterexamples comprise data that corresponds to both initial (IniConf) and intermediary (IntConf) model configurations, as the model and the deductive verification process are functional. Said initial model configurations (IniConf) comprise initial values of model inputs and internal memory at the beginning of the execution of the Ladder model (MOD), that lead to the case where said property is not satisfied. Said intermediary model configurations comprise intermediary values of internal memory, between the beginning of the execution of the Ladder model (MOD) and the model location where said property is not satisfied.

However, said counterexamples don't comprise all of the intermediary values generated during execution. For example, four values may be assigned to a Ladder program variable X during execution thereof. The four values are therefore assigned to four intermediary variables (X1, X2, X3, X4) that are representative of the variable X. The obtained counterexamples may, in some cases, not return the values corresponding to all of the intermediary variables (X1, X2, X3, X4).

As detailed below, a preferred method to overcome this case is to select initial configurations from the obtained counterexamples, and to recompute the values of the intermediary variables (X1, X2, X3, X4) by executing the model with said initial configurations (IniConf) selected from the counterexamples.

The fifth step consists in simulating the execution (EXE) of the Ladder program in order to compute the intermediary values of internal memory from the model's initial configurations obtained in the fourth step.

In a preferred embodiment, the fifth step comprises a first intermediary step (AST-TRANSB) consisting in translating the model initial configurations (IniConf) obtained in the fourth step, into corresponding initial configurations (AST-IniConf) of the AST representation, preferably expressed in OCAML language. Such a translation can be derived from the translation of the AST representation into the model as operated in the first step.

The fifth step comprises a second intermediary step (AST-SyEx) consisting in computing the AST representation by a Symbolic Execution Engine, with said corresponding initial configurations (AST-IniConf), in order to retrieve and record intermediary values of the AST representation internal memory (AST-IntConf). The AST representation execution operates as a simulation of the Ladder program execution. Collection of intermediary values is performed to the point of the execution where an error or a specification violation happens. The fifth step may be performed on said deductive program verification platform as well.

The AST representation is then advantageous as it allows generating intermediary values which cannot be obtained by execution of the Ladder program. One reason for this is that in the Ladder model, the logical gates connecting instructions aren't represented as variables. Therefore, errors occurring at such code locations aren't made explicit in the returned counterexamples. Upon translation in the first step, values at these code locations are lost and are not retrieved among the counterexamples values provided upon the third step. Values at these code locations, though, are essential for a proper interpretation of what caused the error. The fifth step also allows retrieval of values at these code locations, thanks to the execution of the AST representation on which single static assignment has been applied.

This fifth step provides model error scenarios, through which the values leading to an error or a specification violation are collected. Model error scenarios are based on the AST representation configurations (AST-IniConf, AST-IntConf).

Figure 5:
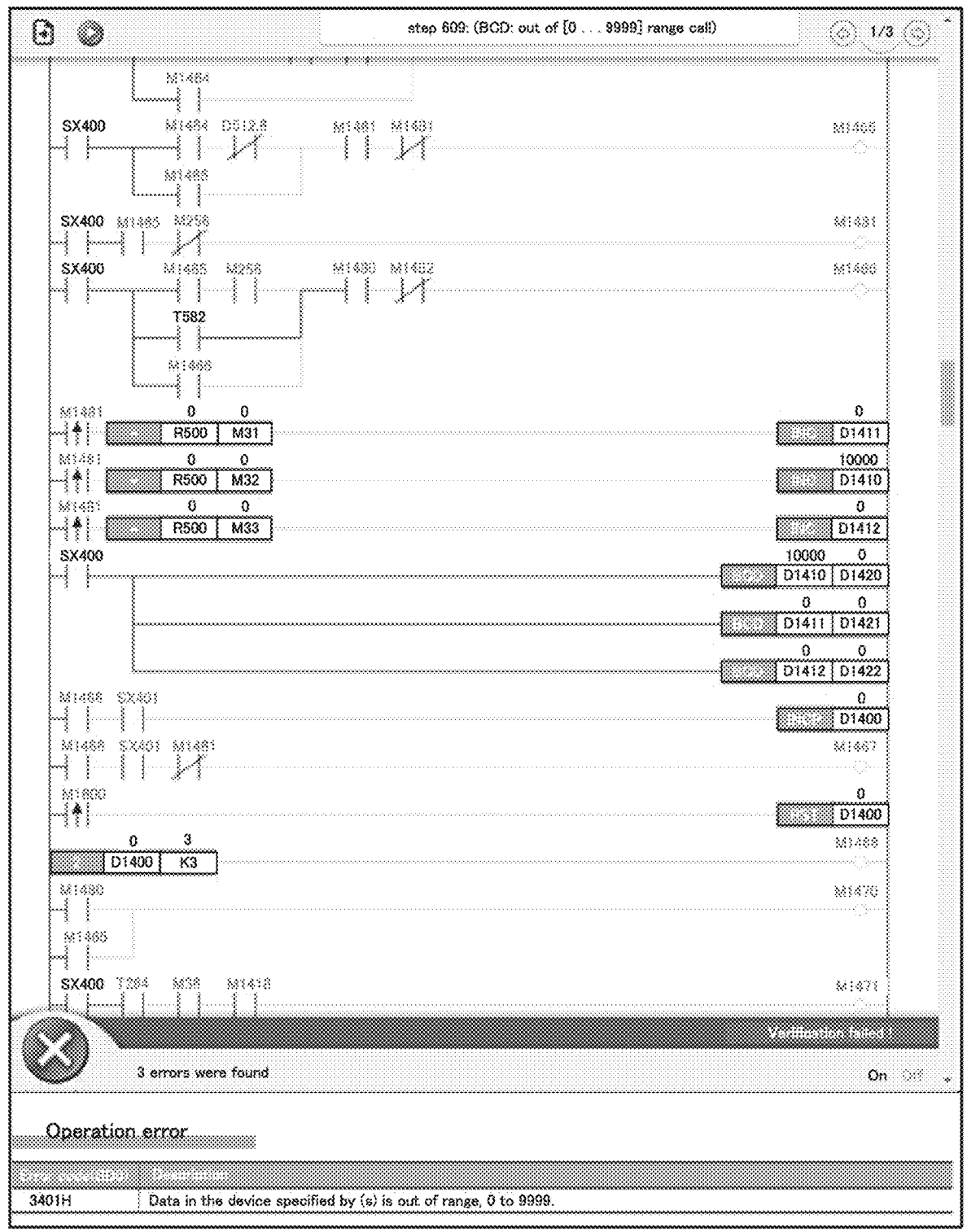
FIG. 5 illustrates an error scenario as a result of the disclosed method execution.
Figure 6:
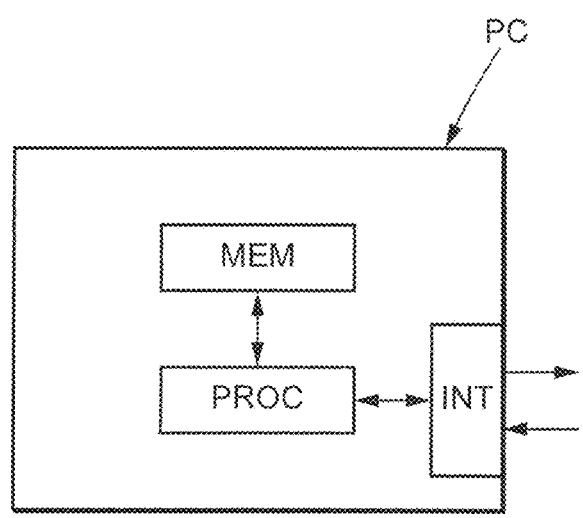
FIG. 6 illustrates an example of a processing circuit PC for executing a Programmable Logic Controller Program analysis method.

The sixth step translates back the model error scenarios to the Ladder program. The AST representation configurations (AST-IniConf, AST-IntConf) are translated back to corresponding configurations of the Ladder program. FIG. 5 illustrates an error scenario with colours for binary values and labels for integers values of said error scenario. The Ladder program is graphically displayed, as shown in FIG. 5, and is enriched with information relative to: error locations in the program; execution paths prior to said error and which are for example indicated with color highlights; values of inputs and internal memory from the beginning of the program execution up to the error or specification violation. Error scenarios, together with error location and reasons information added to the model in the first step, give very complete information on the error that was found and how to fix it.

The invention claimed is:

1. A Programmable Logic Controller Program analysis method comprising:
    translating (TRANS) an original program (PROG) of the type of a Programmable Logic Controller (PLC) Program which is a Ladder program, into a model (MOD) in a logical framework by using predefined modelizations of Ladder primitives;
    determining, from at least said model (MOD) and predefined language formalization, a set of properties (Prop) on internal variables of said original program;
    verifying, by an automated solver (SMT), satisfiability of said set of properties (Prop) coupled with user specifications (IntProp) and providing, if contraposition of a property (Prop) from said set of properties (Prop) is satisfiable, a set of counter-examples (PROOF NOK) representative of model inputs and internal memory values for which said property (Prop) contraposition is satisfiable, or providing, if said set of properties (Prop) is always satisfied, confirmation (PROOF OK) thereof;
    translating counter-examples (PROOF NOK), into error initial configurations (IniConf) of said model, said error initial configurations (IniConf) comprising initial values of inputs and initial values of internal memory;
    simulating an execution (EXE) of the model with error initial configurations (IniConf) of said model, and recording error intermediary configurations (AST-IntConf) of said model simulation, from the beginning of execution up to said property violation, said intermediary configurations comprising intermediary values of internal memory;
    translating said error initial configurations (IniConf) of said model and said error intermediary configurations (AST-IntConf) of said model simulation, into error initial and intermediary configurations (Lad-IniConf, Lad-IntConf) of said original program (PROG); and
    displaying said error initial and intermediary configurations (Lad-IniConf, Lad-IntConf) with an indication of a location of an error in said original program (PROG).

2. The Programmable Logic Controller Program analysis method according to claim 1, wherein translating (TRANS) the original program (PROG) into the model (MOD) comprises expressing (AST-TRANS) said original program (PROG) as an Abstract Syntax Tree (AST), and generating (MOD-TRANS) the model (MOD) from said Abstract Syntax Tree (AST).

3. The Programmable Logic Controller Program analysis method according to claim 2, wherein simulating said execution (EXE) of said model comprises:
    translating (AST-TRANSB) said error initial configurations (IniConf) of said model into error initial configurations (AST-IniConf) corresponding to the Abstract Syntax Tree (AST);
    computing (AST-SyEx) the Abstract Syntax Tree (AST) with said corresponding initial configurations (AST-IniConf) and retrieving intermediary values of internal memory (AST-IntConf) corresponding to the Abstract Syntax Tree (AST).

4. The Programmable Logic Controller Program analysis method according to claim 1, wherein the model (MOD) is expressed in a first-order logical framework.

5. The Programmable Logic Controller Program analysis method according to claim 2, wherein the model (MOD) is expressed in a first-order logical framework.

6. The Programmable Logic Controller Program analysis method according to claim 1, wherein translating (TRANS) the original program (PROG) into the model (MOD) comprises executing static single assignment transformation (SSAT).

7. The Programmable Logic Controller Program analysis method according to claim 2, wherein translating (TRANS) the original program (PROG) into the model (MOD) comprises executing static single assignment transformation (SSAT).

8. The Programmable Logic Controller Program analysis method according to claim 1, wherein, during determining the set of properties (Prop), said set of properties (Prop) is computed using Dijkstra's weakest precondition calculus to determine preconditions (PreCond) on said set of properties (Prop), verification of said set of properties (Prop) being performed on the basis of preconditions (PreCond) thereof.

9. The Programmable Logic Controller Program analysis method according to claim 2, wherein, during determining the set of properties (Prop), said set of properties (Prop) is computed using Dijkstra's weakest precondition calculus to determine preconditions (PreCond) on said set of properties (Prop), verification of said set of properties (Prop) being performed on the basis of preconditions (PreCond) thereof.

10. The Programmable Logic Controller Program analysis method according to claim 1, wherein satisfiability of said set of properties coupled with user specifications is verified using a Satisfiability Modulo Solver (SMT).

11. The Programmable Logic Controller Program analysis method according to claim 2, wherein satisfiability of said set of properties coupled with user specifications is verified using a Satisfiability Modulo Solver (SMT).

12. A non-transitory computer readable medium for storing a computer program comprising instructions for performing the method as claimed in claim 1, when these instructions are run by a processor.

13. A non-transitory computer readable medium for storing a computer program comprising instructions for performing the method as claimed in claim 2, when these instructions are run by a processor.

14. An apparatus for executing a Programmable Logic Controller Program analysis method according to claim 1.

15. An apparatus for executing a Programmable Logic Controller Program analysis method according to claim 2.

* * * * *